United States Patent [19]

Zellhoefer

[11] 4,156,056
[45] May 22, 1979

[54] THERMAL CELL AND METHOD OF MAKING THE SAME

[75] Inventor: Glenn F. Zellhoefer, Normal, Ill.

[73] Assignee: National Union Electric Corporation, Stamford, Conn.

[21] Appl. No.: 114,051

[22] Filed: Jun. 1, 1961

[51] Int. Cl.² .............................................. H01M 6/30
[52] U.S. Cl. ................................... 429/112; 252/182.1
[58] Field of Search ................. 136/83, 83.1, 90, 90.5, 136/137; 429/112; 252/182.1

[56] References Cited

U.S. PATENT DOCUMENTS

| | | | |
|---|---|---|---|
| 856,162 | 6/1907 | Kitsee | 73/359 R |
| 2,081,926 | 6/1937 | Gyuris | 429/102 |
| 2,102,701 | 12/1937 | Gyuris | 429/29 |
| 2,999,122 | 9/1961 | Launer | 429/112 |

OTHER PUBLICATIONS

Goodrich, "J. of Electrochem Society," vol. 99, No. 8, pp. 207C, 208C. Aug. 1952.
McKee et al., "Tenth Annual Battery Research Conference," pp. 26–28, May 24, 1956.

Primary Examiner—Leland A. Sebastian
Attorney, Agent, or Firm—Merriam, Marshall & Bicknell

EXEMPLARY CLAIM

1. In a thermal cell including a mass of electrolyte, a depolarizing agent, a cathode and an anode, that improvement wherein the said depolarizing agent comprises from about 81% to about 96.5% by weight of $V_2O_5$, from about 3% to about 15.5% by weight of $B_2O_3$, and from about 0.5% to about 3.5% by weight of bentonite.

13 Claims, 3 Drawing Figures

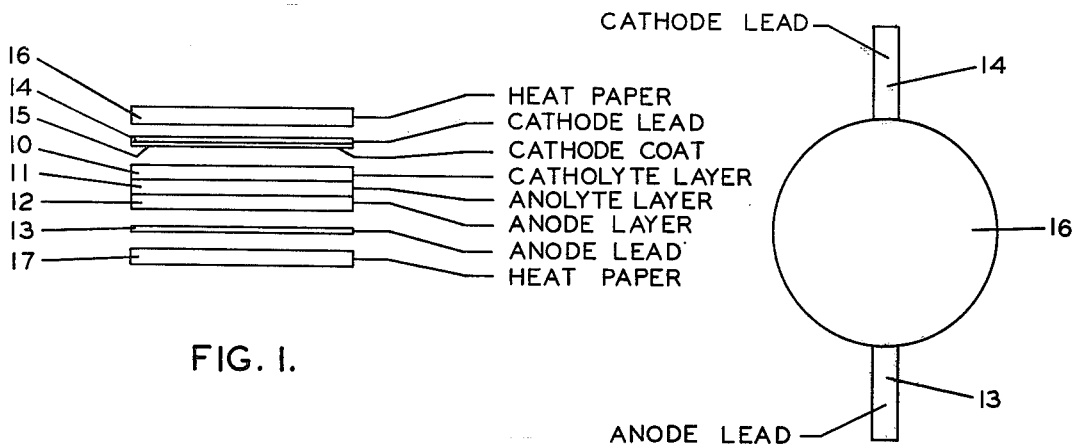
FIG. 1.
FIG. 2.
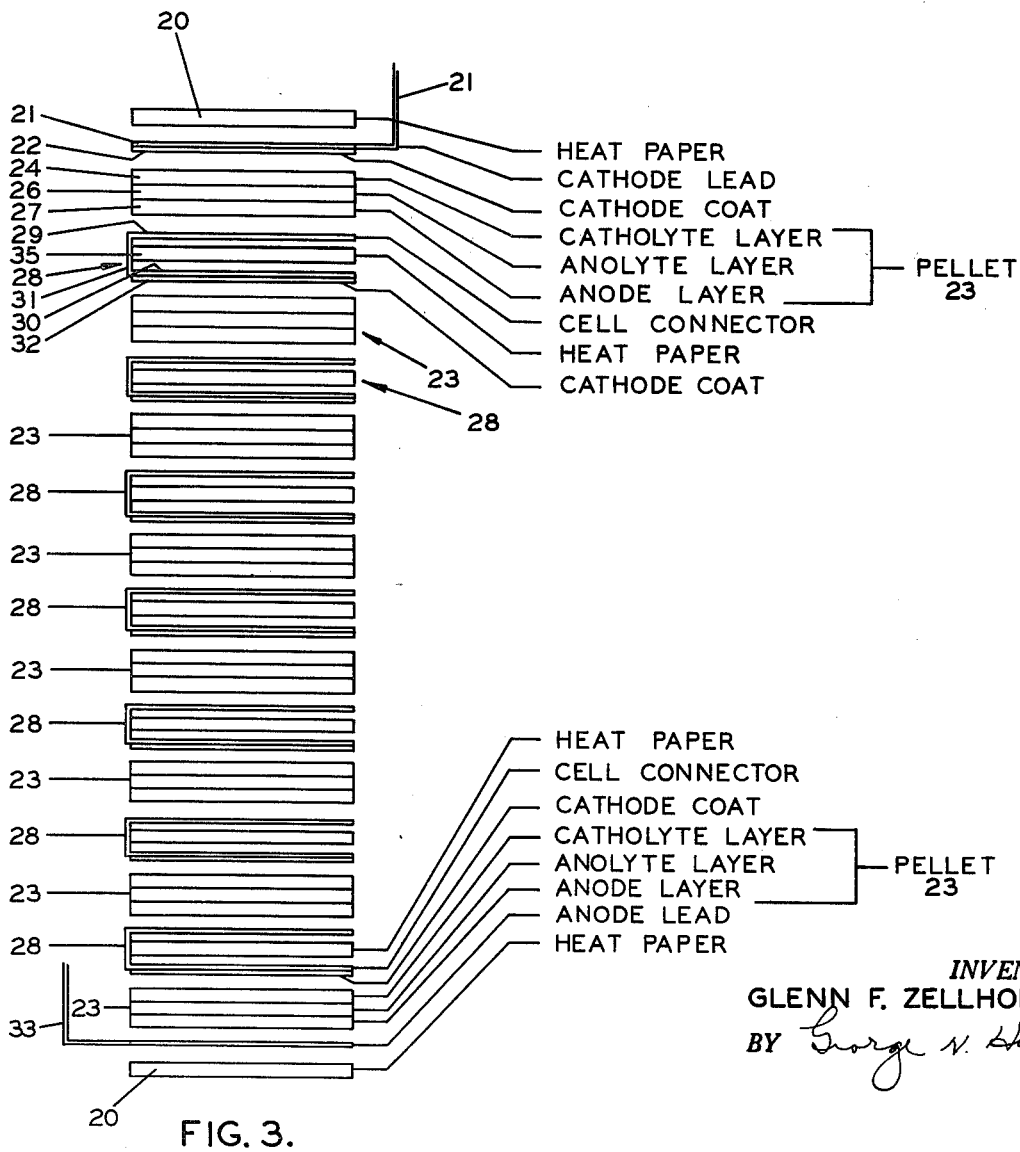
FIG. 3.
INVENTOR.
GLENN F. ZELLHOEFER
BY George N. Hibben

THERMAL CELL AND METHOD OF MAKING THE SAME

This invention relates to thermal cells and a method of making the same and has particular reference to such cells employing depolarizing agents which are, according to the present invention, comprised of a fused mixture of $V_2O_5$, $B_2O_3$ and bentonite.

Thermal cells may be defined as electrochemical power supplies based upon electrolytes of various inorganic salts which remain solid and non-conductive at all storage temperature. When the cell is heated to some elevated temperature the electrolyte melts and becomes conductive and electrical energy may be withdrawn from the system.

The use of $V_2O_5$ in the catholyte of a thermal cell is disclosed in my copending application Ser. No. 406,608, filed Jan. 27, 1954, now U.S. Pat. No. 3,311,503, and also in my copending application Ser. No. 536,685, filed Sept. 23, 1955, now U.S. Pat. No. 3,954,503. Thermal cells embodying $V_2O_5$ as the depolarizing agent in the catholyte thereof have been used extensively in thermal batteries designed for an operational life of a range of time from a fraction of a second to two minutes. It has been found in connection with such cells that the side reactions that occur during discharge thereof deplete the available supply of $V_2O_5$ and therefore their useful life has been limited, particularly in those applications which require close voltage regulation under heavy or moderate current drain. It has been found that the above limitations resulting from the use of $V_2O_5$ as the depolarizing agent in the catholyte of a cell may be minimized by forming the depolarizing agent of a composition consisting of a solid solution of $V_2O_5$, $B_2O_3$ and bentonite. This constitutes a greatly improved form of depolarizing agent which is not so readily depleted during battery operation as is a depolarizing agent of pure $V_2O_5$ and, consequently, the useful, operational life of the cell is greatly extended.

A principal object of the invention is to provide a thermal cell embodying an improved form of depolarizing agent.

Another object of the invention is to provide a new and improved thermal cell embodying a solid solution of $V_2O_5$, $B_2O_3$ and bentonite as the depolarizing agent.

A further object of the invention is to provide a new and improved method of manufacturing thermal cells embodying a solid solution of $V_2O_5$, $B_2O_3$ and bentonite as the depolarizing agent.

In the drawing,

FIG. 1 is a diagrammatic and somewhat expanded view in side elevation of a thermal cell having a catholyte layer embodying the improved form of a depolarizing agent comprising the present invention.

FIG. 2 is a top plan view of the structure shown in FIG. 1.

FIG. 3 is a diagrammatic and somewhat expanded view in side elevation illustrating the cell structure shown in FIG. 1 embodied in a completely assembled thermal battery comprising eight cells.

Referring more particularly to FIGS. 1 and 2 of the drawing, there is shown a single thermal cell comprising a three layer pellet having a catholyte layer 10, an anolyte layer 11, and an anode layer 12. The catholyte layer 10 is composed of a pressed powdered mixture consisting of approximately three parts by weight of a eutectic mixture of KCl and LiCl and approximately five parts by weight of a solid solution consisting of about 93 wt. % $V_2O_5$, about 5.5 wt. % $B_2O_3$, and about 1.5 wt. % bentonite. The latter solid solution containing the $V_2O_5$, $B_2O_3$ and bentonite comprises the depolarizing agent of the present invention. The anolyte layer 11 is a pressed powdered mixture consisting of approximately 38 wt. % kaolin and approximately 62 wt. % of a eutectic mixture of KCl and LiCl. The anode layer 12 is composed of pressed powdered magnesium.

Below the anode layer 12, as shown in FIG. 1, there is a metal disk and lead 13 composed of nickel, and above the catholyte layer 10 is a similar nickel disk 14 upon the surface of which there is a cathode coat 15 adapted for intimate contact with the catholyte layer 10. This cathode coat 15 may comprise a fused mixture of $V_2O_5$ and $B_2O_3$ but preferably comprises a fused mixture of $B_2O_3$, $V_2O_5$ and bentonite. The metal disks 13 and 14 are composed of nickel 0.005 inches thick.

Above the disk 14 is a layer of heat paper 16 which may comprise a stoichiometric mixture of zirconium and barium chromate powder with a binder of asbestos or the like. A similar layer of heat paper 17 is disposed below the disk and lead 13. It is to be understood that while the various elements shown in FIG. 1 are illustrated in separated or spaced relation, nevertheless, in practice, they are pressed down into intimate engagement to form a thermal cell operable in the manner above described. The separation of the parts has been for the purpose of clarity of illustration and description.

When the thermal cell is activated in the well known manner by combustion of the heat paper, the solid solution of $V_2O_5$, $B_2O_3$ and bentonite in the catholyte layer 10 permits the $V_2O_5$ to function as a depolarizer with voltage characteristics essentially the same as pure $V_2O_5$ but the rate of the side reactions involving $V_2O_5$ during discharge of the cell is considerably reduced. This reduction in the rate of side reactions results in a noticeable and important increase in the useful life of the cell and it has been found that such increase may be as great as 100% of that of pure $V_2O_5$.

While I have set forth above a specific formulation of $B_2O_3$, $V_2O_5$ and bentonite comprising a preferred form of the depolarizing agent of the present invention, it has been found that such formulation may be varied within limits with beneficial results. For example, the $V_2O_5$ portion of the depolarizing agent of the catholyte layer may be varied within a range of from about 81 wt. % to about 96.5 wt. %, the $B_2O_3$ may be varied within a range of from about 3 wt. % to about 15.5 wt. %, and the bentonite may be varied within a range of from about 0.5 wt. % to about 3.5 wt. %. Similarly, the composition of the cathode coat 15 on the nickel disk 14 may comprise a solid solution of $V_2O_5$ and $B_2O_3$ as disclosed in my aforementioned copending application Ser. No. 406,608 but preferably it may comprise the solid solution of $V_2O_5$, $B_2O_3$, and bentonite as disclosed above. The metal disks 14 and 13 may be composed of nickel, a nickel alloy such as Inconel, or stainless steel, and the anolyte layer 11 may be of the various compositions disclosed in my aforementioned copending application Ser. No. 536,685. Likewise, the anode layer 12 may be composed of pressed powdered magnesium, sheet magnesium, pressed calcium, sheet calcium, or a pressed powdered alloy consisting of about 10 wt. % lithium and about 90 wt. % lead.

The catholyte layer 10 of the pellet is formed by the process of first fusing a mixture of $V_2O_5$ and $B_2O_3$, and/or $H_3BO_3$, in a nickel or Inconel crucible at 750° to 800° C. and then adding and fusing therein the required amount of bentonite. This fused mixture is then poured onto a nickel or Inconel plate on which it is cooled and formed into slabs. The cooled slabs are then ground in a mill after which the ground product is ballmilled and then passed through a screen. The screened powder with particles ranging in size from 80-200 mesh is then admixed and ballmilled with a eutectic mixture of KCl and LiCl and the resultant mixture is then pressed to form the catholyte layer 10 of the pellet.

Because a plurality of cells are utilized in the form of battery shown in FIG. 3, cell connectors 28 are utilized to electrically connect one cell of the stack with its adjacent cells. The uppermost cell of the stack shown in FIG. 3 comprises a layer of heat paper 20 and a lead and disk 21 having a cathode coat 22 of the composition above described. Below the cathode coat 22 is a pellet 23 composed of the catholyte layer 24, the anolyte layer 26 and the anode layer 27, each of said layers being of compositions similar to those of layers 10, 11 and 12, respectively, as described above with respect to the single cell of FIG. 1. Below the pellet 23 is a cell connector comprising a disk 29, a spaced disk 30, and an integral joint 31 conductively connecting said disks. Between the disks of the cell connector there is a further layer of heat paper 35 similar to the heat paper 20 and serving the same purpose. The cathode disk 30 of the connector has a cathode coat 32 on its under side and below the cathode coat 32 is another pellet 23.

This alternating arrangement of pellets 23 and cell connectors 28 is repeated in the stack to form the remainder of the eight cell battery except that at the bottom of the stack below the bottom pellet 23 there is an anode lead 33, which together with the cathode lead 21 at the top of the stack, constitute the external electrode leads of the battery. The catholyte 24 in this multi-cellular battery has the same mode of operation and produces the same beneficial results as the catholyte 10 of the single cell battery above described. It is to be understood that although the pellets, cell connectors, anode and cathode leads and heat paper layers are shown to be in spaced relation, such spacing is for clarification only and in actual assembly the various component layers are pressed down into intimate engagement.

Although there have been described above and illustrated in the drawing preferred embodiments of the depolarizing agent of a thermal cell and a method of making the same, it is to be understood that modifications and changes may be made in the details of the compositions thereof and in the steps of the process of making the same without departing from the spirit and scope of the appended claims.

I claim:

1. In a thermal cell including a mass of electrolyte, a depolarizing agent, a cathode and an anode, that improvement wherein the said depolarizing agent comprises from about 81% to about 96.5% by weight of $V_2O_5$, from about 3% to about 15.5% by weight of $B_2O_3$, and from about 0.5% to about 3.5% by weight of bentonite.

2. The improvement according to claim 1 wherein the depolarizing agent is admixed with a fusible electrolyte salt.

3. The improvement according to claim 1 wherein the depolarizing agent is admixed with a eutectic mixture of KCl and LiCl.

4. The improvement according to claim 1 wherein the depolarizing agent comprises a prefused mixture of from about 81% to about 96.5% by weight of $V_2O_5$, from about 3% to about 15.5% by weight of $B_2O_3$, and from about 0.5% to about 3.5% by weight of bentonite.

5. The improvement according to claim 1 wherein the depolarizing agent comprises a prefused mixture of approximately 93% by weight of $V_2O_5$, about 5.5% by weight of $B_2O_3$, and about 1.5% by weight of bentonite.

6. In a thermal cell including a mass of electrolyte, a depolarizing agent, a cathode and an anode, that improvement wherein said depolarizing agent comprises a prefused, powdered mixture of from about 81% to about 96.5% by weight of $V_2O_5$, from about 3% to about 15.5% by weight of $B_2O_3$, and from about 0.5% to about 3.5% by weight of bentonite, said depolarizing agent being disposed in contact with the mass of electrolyte and said cathode.

7. In a thermal cell comprising a three layer pellet consisting of a catholyte layer, an anolyte layer and an anode layer, and a cathode, the improvement wherein said catholyte layer is a powdered mixture of a eutectic mixture of KCl and LiCl and a mixture of from about 81% to about 96.5% by weight of $V_2O_5$, from about 3% to about 15.5% by weight of $B_2O_3$, and from about 0.5% to about 3.5% by weight of bentonite.

8. The method of preparing a catholyte composition for use in a thermal cell which comprises the steps of fusing a mixture of $V_2O_5$, with at least one substance selected from the group consisting of $B_2O_3$ and $H_3BO_3$, adding a quantity of bentonite to said first fused mixture and fusing the same therewith, cooling the composite fused mixture to solidify the same, reducing the composite fused mixture to powder form, and admixing the same with a fusible electrolyte salt.

9. The method of claim 8 further characterized in that said composite fused mixture comprises from about 81% to about 96.5% by weight of $V_2O_5$, from about 3% to about 15.5% by weight of $B_2O_3$, and from about 0.5% to about 3.5% by weight of bentonite.

10. The method of claim 8 further characterized in that said composite fused mixture comprises about 93% by weight of $V_2O_5$, about 5.5% by weight of $B_2O_3$, and about 1.5% by weight of bentonite.

11. The method of preparing a catholyte composition for use in a thermal cell which comprises the steps of fusing a mixture of $V_2O_5$ with at least one substance selected from the group consisting of $B_2O_3$ and $H_3BO_3$, admixing a quantity of bentonite with said first fused mixture and fusing the same therewith, pouring the composite fused mixture and cooling the same in slab form, grinding and milling the slab to finely powdered form, and mixing and milling the finely powdered material with a eutectic mixture of KCl and LiCl.

12. The method of claim 11 further characterized in that said composite fused mixture comprises from about 81% to about 96.5% by weight of $V_2O_5$, from about 3% to about 15.5% by weight of $B_2O_3$, and from about 0.5% to about 3.5% by weight of bentonite.

13. The method of claim 11 further characterized in that said composite fused mixture comprises about 93% by weight of $V_2O_5$, about 5.5% by weight of $B_2O_3$, and about 1.5% by weight of bentonite.

* * * * *